(12) United States Patent
Miyazawa (10) Patent No.: US 8,440,295 B2
(45) Date of Patent: May 14, 2013

(54) MECHANICAL SEAL DEVICE, SLIDING ELEMENT, AND METHOD OF PRODUCTION THEREOF

(75) Inventor: Masami Miyazawa, Tokyo (JP)

(73) Assignee: Eagle Industry Co. Ltd., Tokyo (JP)

( * ) Notice: Subject to any disclaimer, the term of this patent is extended or adjusted under 35 U.S.C. 154(b) by 885 days.

(21) Appl. No.: 11/918,939

(22) PCT Filed: Apr. 18, 2006

(86) PCT No.: PCT/JP2006/308117
§ 371 (c)(1),
(2), (4) Date: Oct. 22, 2007

(87) PCT Pub. No.: WO2006/115118
PCT Pub. Date: Nov. 2, 2006

(65) Prior Publication Data
US 2009/0022973 A1    Jan. 22, 2009

(30) Foreign Application Priority Data

Apr. 22, 2005   (JP) .................. 2005-125080

(51) Int. Cl.
*B32B 3/26* (2006.01)
*B32B 3/00* (2006.01)
*F16J 15/00* (2006.01)
*F16J 15/34* (2006.01)

(52) U.S. Cl.
USPC ........ 428/304.4; 277/348; 277/352; 277/358; 428/316.6

(58) Field of Classification Search ............... 428/304.4, 428/316.6; 277/348, 352, 358
See application file for complete search history.

(56) References Cited

U.S. PATENT DOCUMENTS

| | | | | |
|---|---|---|---|---|
| 3,388,913 A | * | 6/1968 | Tracy | 277/371 |
| 4,416,458 A | * | 11/1983 | Takenaka et al. | 277/399 |
| 6,113,278 A | | 9/2000 | Ohira | |
| 6,895,208 B2 | * | 5/2005 | Nakatogawa et al. | 399/329 |

FOREIGN PATENT DOCUMENTS

| | | |
|---|---|---|
| EP | 1132634 A2 * | 9/2001 |
| EP | 1873429 A1 * | 1/2008 |
| JP | 60-169463 | 11/1985 |
| JP | 06-207186 | 7/1994 |
| JP | 09-273634 | 10/1997 |
| JP | 11-036004 | 2/1999 |
| JP | 11-103876 | 5/1999 |
| JP | 2001-026792 | 1/2001 |
| JP | 2004-116590 | 4/2004 |

OTHER PUBLICATIONS

English translation of JP 2001-026792, see IDS filed Oct. 26, 2007 for date and inventor.*

* cited by examiner

Primary Examiner — Victor Chang
(74) Attorney, Agent, or Firm — Arent Fox LLP (57) ABSTRACT

A sliding element having a sliding surface, wherein a substrate forming the sliding surface is formed with a resin layer, the resin layer has a plurality of porous parts on its surface, and the porous parts are impregnated with a fluorinated oil. Preferably, the resin layer contains a first resin and a second resin having a melting point higher than that of the first resin, and the porous parts of the resin layer are formed by heating the resin layer at a temperature of at least the melting point of the first resin and less than the melting point of the second resin, and exposed at the surface of the resin layer by grinding the resin layer.

6 Claims, 3 Drawing Sheets

MECHANICAL SEAL DEVICE, SLIDING ELEMENT, AND METHOD OF PRODUCTION THEREOF

CROSS-REFERENCE TO RELATED APPLICATION

This application is a National Stage entry of International Application No. PCT/JP2006/308117, filed Apr. 18, 2006, the entire specification claims and drawings of which are incorporated herewith by reference.

TECHNICAL FIELD

The present invention relates to a sliding element, a method of production of the same, and a mechanical seal device having this sliding element, and more particularly relates to a sliding element, having corrosion resistance, superior in wear resistance, and effectively preventing ringing (sliding noise) at the time of sliding and wear of the sliding surface even under dry lubrication conditions, a method of production of the same, and a mechanical seal device having such sliding elements.

BACKGROUND ART

A mechanical seal device seals fluids by a pair of sliding elements sliding in close contact through their sliding surfaces. Therefore, as the sliding elements of this mechanical seal device, a material with a low friction and superior wear resistance is selected. In particular, sliding elements sliding in a non-lubricated state with no fluid lubrication film supplied between the sliding surfaces are required to have superior self-lubricating ability and wear resistance. For sliding elements sliding in the non-lubricated state, there has been used, for example, a carbon material or a polytetrafluoroethylene resin material containing various materials (for example, graphite, glass fiber, carbon fiber, metal powder, etc.) as an aggregate.

On the other hand, when using a carbon material as the material forming the above sliding elements, the carbon ends up losing its lubricating ability in an atmosphere such as a vacuum, a reducing gas or dry air with a low dew point, so that it is sometimes remarkably worn.

Further, even when using a polytetrafluoroethylene resin material containing an aggregate as the material forming the above sliding elements, the effect of the above atmospheres is relatively low compared with a carbon material, but still wear ends up occurring.

In particular, in stirring machines etc. used in the process of production of food or pharmaceuticals, from the viewpoint of the influence on sanitation or the properties of the product, it is necessary to prevent the entry of impurities. Therefore, in a mechanical seal device used in this stirring machine etc., to prevent the entry of wearing powder (impurities) into the product as much as possible, it is required to reduce wear of the sliding elements as much as possible even in the non-lubricated state.

For this reason, to reduce the wearing of the sliding elements, in sliding elements comprised of polytetrafluoroethylene resin including this aggregate, the types and ratios of the aggregates contained have been studied to improve the wear resistance (for example, Patent Article 1).

However, in a polytetrafluoroethylene resin sliding material containing an aggregate, to maintain the lubricating ability, it is difficult to make the content of the polytetrafluoroethylene resin having low wear resistance less than 70%, so that there were limits to improvement of the wear resistance. Therefore, it was impossible to use this for sliding elements for the various equipments used in the process of production of food and pharmaceuticals.

On the other hand, in recent years, a ceramic or metal material containing a self-lubricating material such as carbon has been sometimes used for non-lubricated sliding elements, but when conditions such as a vacuum state and pressurized state are repeated, the sliding surfaces get galling or ringing due to poor lubrication etc. occurs well as generating wearing powders. Therefore, it has been attempted to provide grooves in the sliding surfaces so as to form a film of gas between the sliding surfaces at the time of sliding and thereby lightening the load of the sliding elements (for example, Patent Article 2). However, even when providing the sliding surfaces with grooves in this way, a sufficient effect could not be obtained under low rotational speed conditions or conditions where the above-mentioned vacuum state or pressurized state are repeated.

[Patent Article 1] Japanese Unexamined Patent Publication (A) No. 2001-26792
[Patent Article 2] Japanese Unexamined Patent Publication (A) No. 5-60247

DISCLOSURE OF INVENTION

Problem to be Solved by the Invention

An object of the present invention is to provide a sliding element having corrosion resistance, even in an atmosphere with no lubrication oil or liquid, or under dry lubrication conditions where no lubricating ability can be expected, able to effectively prevent ringing (sliding noise) at the time of sliding, superior in wear resistance, and with extremely small generation of wearing powder, and a method of production of the same. Further, another object of the present invention is to provide a mechanical seal device having such sliding elements and favorable to be used even under dry lubrication conditions.

Means for Solving the Problem

To achieve the above object, there is provided a sliding element having a sliding surface, wherein a substrate forming the sliding surface is provided with a resin layer, the resin layer has a plurality of porous parts at its surface, and the porous parts contain a fluorinated oil according to the present invention.

In the sliding element of the present invention, preferably, the resin layer contains a first resin and a second resin higher than the first resin in melting point.

In the sliding element of the present invention, preferably, the porous parts of the resin layer are porous parts formed by heating the resin layer at a temperature of at least the melting point of the first resin and less than the melting point of the second resin and are exposed at the surface of the resin layer by grinding the resin layer.

In the sliding element of the present invention, preferably, the first resin is a polytetrafluoroethylene resin and/or its modified product, the second resin is a polyamide-imide resin and/or polyimide resin, and a content of the first resin with respect to 100 wt % of the resin layer as a whole is 5 to 55 wt %.

In the sliding element of the present invention, preferably, the fluorinated oil is a perfluoropolyether comprised of carbon atoms, fluorine atoms and oxygen atoms, and/or its modified product.

In the sliding element of the present invention, preferably, the substrate is one selected from carbon, silicon carbide, a carbon and silicon carbide composite material, and a ceramic material.

A method of production of a sliding element of the present invention comprises the steps of forming a resin layer containing a first resin and a second resin having a melting point higher than that of the first resin, at a portion to form a sliding surface of a substrate; heating the resin layer at a temperature of at least the melting point of the first resin and less than the melting point of the second resin and causing the first resin to melt to cause shrinkage and slight flow of the resin to form a plurality of porous parts mainly at the interface of the first resin and the second resin and inside the resin layer; grinding a surface of the resin layer to cause at least part of a plurality of the porous parts to be exposed at the surface; and impregnating the exposed porous parts with a fluorinated oil.

In the method of production of a sliding element of the present invention, preferably, the first resin is a polytetrafluoroethylene resin and/or its modified product, the second resin is a polyamide-imide resin and/or polyimide resin, and the content of the first resin with respect to 100 wt % of the resin layer as a whole is 5 to 55 wt %.

In the method of production of a sliding element of the present invention, preferably, the fluorinated oil is a perfluoropolyether comprised of carbon atoms, fluorine atoms, and oxygen atoms and/or its modified product.

In the method of production of a sliding element of the present invention, preferably, the substrate is one selected from carbon, silicon carbide, a carbon and silicon carbide composite material, and a ceramic material.

A mechanical seal device of the present invention is a mechanical seal device sealing by bringing a pair of sliding elements into abutment, each sliding element comprises a sliding element of the present invention or sliding element produced by a method of production of the present invention.

Effects of the Invention

According to the sliding element of the present invention, the sliding surface is formed by a resin layer having a plurality of porous parts, and the porous parts are impregnated with a lubrication oil constituted by a fluorinated oil. Therefore, it is possible to effectively prevent wear of the sliding surface, to reduce the generation of wearing powder even under dry lubrication conditions and to use this sliding element for a mechanical seal device used under the dry lubrication conditions.

The fluorinated oil impregnated in the porous parts is oil superior in corrosion resistance, so that by impregnating this fluorinated oil in the sliding surface, the sliding surface can be improved in corrosion resistance.

Further, in the sliding element of the present invention, preferably by comprising the resin layer by a first resin and a second resin higher than this first resin in melting point and further heating this resin layer to at least the melting point of the first resin and less than the melting point of the second resin, the porous parts are formed. Therefore, it is possible to leave the second resin in the solid state and to melt only the first resin, resulting in forming a plurality of dense porous parts around the interface between the first resin and second resin (note that melting of first resin does not result in large flow due to non-load condition).

Further, in the present invention, after forming the dense porous parts in the resin layer, the resin layer is grinded to expose the dense porous parts at the surface of the resin layer, and the exposed porous parts are impregnated with the fluorinated oil. Further, since this impregnated fluorinated oil is contained in the fine porous parts, it can be kept adsorbed in the porous parts for a long period of time. Therefore, even when using the sliding element of the present invention in dry lubrication conditions, it is possible to stably use over a long period of time without flowing out the impregnated fluorinated oil from the porous parts.

Further, the mechanical seal device of the present invention has sliding elements of the present invention having the above characteristics as its sliding elements, so that it is possible to favorably use even under dry lubrication conditions.

BRIEF DESCRIPTION OF THE DRAWINGS

Below, the present invention will be explained with reference to the embodiments shown in the drawings, wherein.

BEST MODE FOR WORKING THE INVENTION

Mechanical Seal Device 1

Figure 1:
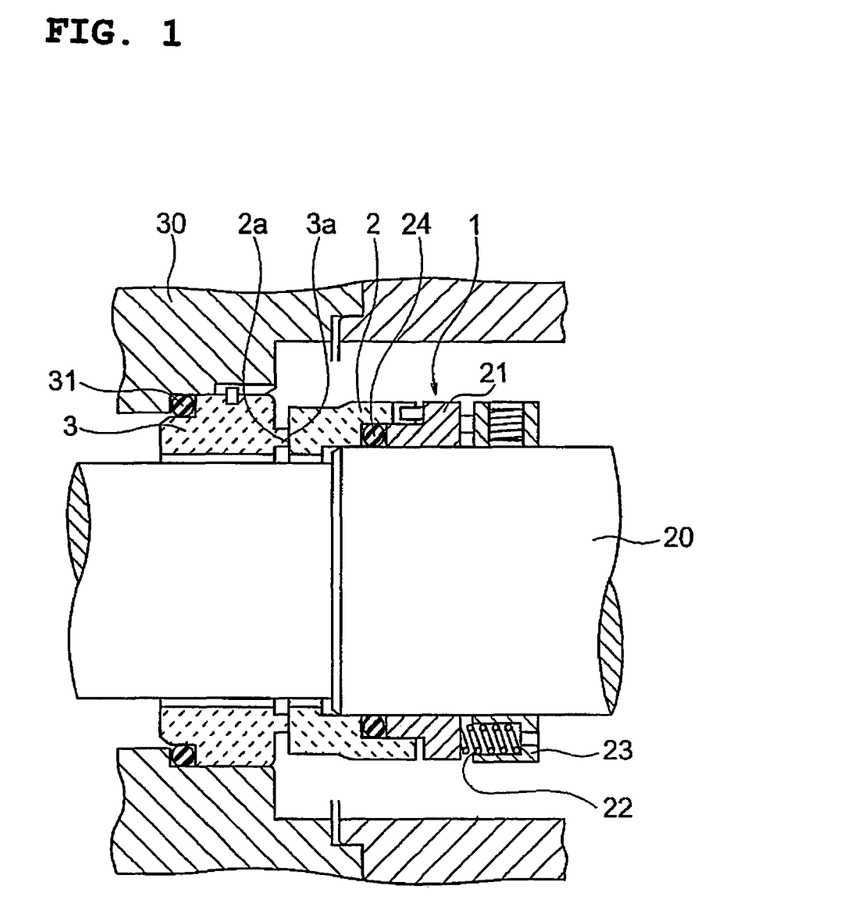
FIG. 1 is a schematic view of a mechanical seal device according to an embodiment of the present invention.

A mechanical seal device 1 according to an embodiment of the present invention is comprised of a rotating ring constituted by a seal ring 2 and a stationary ring constituted by a floating seat 3, brought into abutment with each other through their sliding surfaces. That is, the seal ring 2 and the floating seat 3 are pressed against each other through the sliding surface 2a of the seal ring 2 and the sliding surface 3a of the floating seat 3. In this configuration, the two sliding surfaces 2a and 3a are sealed regardless of whether the shaft 20 is rotating or not rotating.

The rotating ring constituted by the seal ring 2 is designed to be pushed in the direction of the floating seat 3 via a packing 24 by a compression ring 21 directly attached to the shaft 20. Further, the pushing force of this compression ring 21 enables the seal ring 2 to rotate along with rotation of the shaft 20 and to be pressed through its seal surface 2a against the seal surface 3a of the floating seat 3. Note that the pushing force of this compression ring 21 can be adjusted by the elastic force of a spring 22 supported by a support ring 23.

On the other hand, the stationary ring constituted by the floating seat 3 is designed to be fixed to a housing 30 through a packing 31 and to be pressed against the above-mentioned seal ring 2 pushed by the compression ring 21 through its sliding surface 3a.

Seal Ring 2 and Floating Seat 3

In the mechanical seal device 1 of the present embodiment, the seal ring 2 on rotating side and the floating seat 3 on stationary side are both comprised of the sliding elements of the present invention. That is, the seal ring 2 and floating seat 3 contain a substrate comprised of a predetermined material and have sliding surfaces 2a and 3a formed with resin layers containing fluorinated oil.

Substrate

In the present embodiment, the substrate forming the seal ring 2 and floating seat 3 is preferably one selected from carbon, silicon carbide, a carbon and silicon carbide composite material, and a ceramic material.

These materials are particularly preferable since they are high in hardness and heat conductivity, low in coefficient of thermal expansion, and good in affinity with fluorinated oil contained in resin layer. Specifically, these materials have a high hardness and feature little deformation due to a load at the time of sliding, and therefore have the effect of suppressing deformation of the resin layer formed on the sliding surfaces 2a and 3a, resulting in the sliding surfaces 2a and 3a to be maintained in a smooth state. Therefore, it is possible to effectively prevent wear at the time of sliding. Further, these materials have a high heat conductivity, so that it is possible to quickly disperse the heat generated at the time of sliding and to effectively prevent problems such as sticking.

The carbon material may be carbonaceous or graphitic. Further, it is not particularly limited in composition and carbonaceous and graphitic types may be used selectively in accordance with the object. Specifically, an aggregate such as natural graphite, artificial graphite, mesophase and carbon black, and binding material such as coal tar pitch and synthetic resin are used as main component, which are mixed, kneaded, and formed, followed by firing at 1000 to 3000° C. to obtain this material.

When comprising the substrate by silicon carbide, for example, a solvent, binder, etc. is added in accordance with need to a silicon carbide powder, which is then formed into a predetermined shape and sintered.

When forming the substrate by a carbon and silicon carbide composite material, for example, the carbon substrate is formed into a predetermined shape, and then is reacted with Si at a high temperature to impregnate the carbon pores with Si and to cause a reaction to form SiC (reaction sintering method). Alternatively, it can be produced by the conversion method of reacting with Si gas to form SiC (vapor phase conversion method).

Further, when forming the substrate by a ceramic material, for example, using at least one type of ceramic powders such as aluminum oxide and $Si_3N_4$ (silicon nitride), and adding a solvent, binder, etc. in accordance with need, the material is formed into a predetermined shape and then sintered.

Note that it is preferable to roughen at least the portions forming the sliding surfaces at the surfaces of the substrate forming the seal ring 2 and floating seat 3 from the viewpoint of improving the bondability with the resin layer.

The sliding surfaces 2a and 3a of the seal ring 2 and floating seat 3 are formed on their surfaces with resin layers having pluralities of porous parts. The porous parts of these resin layers contain fluorinated oil.

In the present embodiment, each resin layer preferably contains a first resin and a second resin having a melting point higher than that of this first resin. Further, the porous parts of the resin layer are preferably dense porous parts formed by heating the resin layer at a temperature of at least the melting point of the first resin and less than the melting point of the second resin to melt the first resin. Further, in the present embodiment, to impregnate these porous parts with fluorinated oil, the resin layer is grinded to expose these dense porous parts at the surface of the resin layer.

As the first resin, a polytetrafluoroethylene resin (PTFE) or a modified product of this polytetrafluoroethylene resin, i.e., a tetrafluoroethylene-perfluoroalkyl-vinyl ether copolymer (PFA), or a fluorinated ethylene-propylene copolymer (FEP), etc., may be mentioned. Among these, from the viewpoint of the, a polytetrafluoroethylene resin is particularly preferable due to its film formability or strength.

As the second resin, a resin having a melting point higher than that of the polytetrafluoroethylene resin suitably used as the first resin is suitable. In particular, a polyamide-imide resin or polyimide resin is preferred. A polyamide-imide resin or polyimide resin have the properties of maintaining their heat resistance, binding force, and film formability even if heated at a temperature higher than the melting point of the polytetrafluoroethylene resin (about 327° C.) as well as superior wear resistance, so that they are most preferable.

The content of the first resin in the resin layer is preferably 5 to 55 wt % with respect to 100 wt % of the resin layer as a whole, more preferably 30 to 40 wt %. If the content of the first resin is too small, the porous parts tend to become harder to be formed. On the other hand, if too large content tends to give the resin layer with reduced strength.

Further, the resin layer may contain various additives in addition to the first resin and second resin. The additives may be suitably selected in accordance with the environment in which the mechanical seal device 1 is used, and for example, molybdenum disulfide, graphite, etc. may be mentioned. When using this additive, the content is preferably 3 to 15 wt %, more preferably 5 to 10 wt % with respect to 100 wt % of the resin layer as a whole.

The thickness of the resin layer is not particularly limited, but is preferably 10 to 30 μm.

The porous parts formed on the surface of each resin layer are preferably dense.

Further, the ratio of presence of the porous parts with respect to 100% of the surface of each resin layer as a whole (porosity) is, in ratio of area, preferably 1 to 10%, more preferably 2 to 5%. If the ratio of presence of porous parts (porosity) is too low, the effects of the present invention tend to be no longer obtained. On the other hand, if too high, the adhesion force as a whole (coating adhesion force) tends to end up falling.

In the present embodiment, the resin layer has a plurality of porous parts at its surface and these porous parts are filled with a fluorinated oil.

This fluorinated oil is, although not particularly limited, a perfluoropolyether comprised of carbon atoms, fluorine atoms and oxygen atoms, or a modified product of this perfluoropolyether is preferable. As the modified product of the perfluoropolyether, for example, a perfluoropolyether into which various functional groups such as a hydroxyl group or chlorine group and carboxyl group have been introduced may be used. These perfluoropolyethers or their modified products are superior in lubricating ability, resistance to deterioration, and chemical resistance, and particularly have the effect of long term adsorption in the porous parts of the resin layer and reduction of wear of the sliding surfaces 2a and 3a.

In the present embodiment, the molecular weight or viscosity of the fluorinated oil contained in the porous parts are not particularly limited and may be selected in accordance with the conditions of use. When used for a mechanical seal device used under high temperature conditions or vacuum conditions, it is preferable to select one with a large molecular weight and difficulty in evaporation.

Method of Production of Seal Ring 2 and Floating Seat 3

Next, the method of production of the seal ring 2 and floating seat 3 of the above embodiments will be explained. First, the substrate for forming the seal ring 2 and floating seat 3 is produced. The substrate may be one selected from the above carbon, silicon carbide, carbon and silicon carbide composite material, and ceramic material, which may be produced by using a binder etc. in accordance with need to form predetermined shapes and then sintering them.

Note that it is preferable to roughen at least the portions forming the sliding surfaces 2a and 3a after sintering the substrate in the present embodiment. By this roughening, it is possible to improve the bonding of the later-formed resin layer and the substrate.

Next, at the portions of this substrate forming the sliding surfaces 2a and 3a, resin layers are formed. Specifically, first, a solution for forming resin layer comprised of the above-mentioned first resin and second resin dispersed or dissolved in a solvent is used to coat the portions forming the sliding surfaces 2a and 3a by spraying or brushing or dipping or another method. Further, the solvent contained in this coated solution for forming resin layer is removed to obtain resin layers before heating.

Note that when using a polytetrafluoroethylene resin as the first resin, polytetrafluoroethylene resin, which is generally insoluble in a solvent, is dispersed in the solvent in the state of particles having a certain particle size so as to prepare the solution for forming resin layer. The particle size of the polytetrafluoroethylene resin particles in this case is preferably a maximum particle size of 10 µm or so with a normal distribution near 3 to 7 µm. Further, if using a resin heated once at a temperature of at least the melting point (about 327° C.) as the polytetrafluoroethylene resin, the effect of the present invention ends up becoming smaller, so that preferably one not having such a thermal hysteresis is used.

The solution for forming resin layer may further contain other additives for forming the resin layer in addition to the first resin and second resin in accordance with need. As such additives, for example, molybdenum disulfide, graphite, etc. may be mentioned.

When using a polytetrafluoroethylene resin as the first resin and using a polyamide-imide resin or polyimide resin as the second resin, as the solvent of the solution for forming resin layer, NMP (N-methyl-2-pyrrolidone) is preferably used. Further, the content of the solvent is normally not more than 30 parts by weight with respect to 100 parts by weight of the total solid content (that is, the first resin, second resin, and additive used in accordance with need). If the content of the solvent is too small, coating on the portions forming the sliding surfaces 2a and 3a tends to become difficult. On the other hand, if too great, the desired porosity can no longer be obtained.

Next, the resin layers before heating formed at the portions forming the sliding surfaces 2a and 3a are heated at a temperature of at least the melting point of the first resin and less than the melting point of the second resin to make the first resin melt. In the present embodiment, since the resin layer is heated at a temperature of at least the melting point of the first resin and less than the melting point of the second resin, it is possible to leave the second resin in a solid state and make only the first resin melt. Further, by selectively making the first resin melt in this way, it is possible to cause the formation of dense porous parts between the melted first resin and solid-state second resin. Note that a plurality of these dense porous parts are formed over the entire inside of the resin layers.

The heating temperature is not particularly limited so long as it is a temperature higher than the melting point of the first resin and lower than the melting point of the second resin. For example, when using a polytetrafluoroethylene resin as the first resin, the heating temperature is preferably higher than the melting point of this polytetrafluoroethylene resin, i.e., 327° C. or more, more preferably 340 to 350° C., and the heating time is preferably 20 to 30 minutes. When the heating temperature is too low, the melting of the polytetrafluoroethylene resin may be insufficient. On the other hand, if the heating temperature is too high, the second resin is liable to end up deteriorating.

Next, to expose the plurality of porous parts formed by heating the resin layers at the surface of the resin layers, the heated resin layers are grinded on their surfaces. In the present embodiment, the porous parts formed by heating the resin layers are mainly formed inside the resin layers. Therefore, it is necessary to grind the surfaces of the resin layers after heating to expose the porous parts at the surfaces. The method of grinding the resin layers is not particularly limited. A known method may be used for the grinding. Further, the grinding depth is preferably 2 to 5 µm. If the grinding depth is too small, the exposure at the surface of the porous parts may be insufficient. On the other hand, if too great, the loss of the material forming the resin layers becomes greater and the productivity ends up falling.

Next, the porous parts exposed at the surface of the resin layers are impregnated with fluorinated oil to obtain the seal ring 2 and floating seat 3 of the present embodiments. As a method of impregnating the porous parts with a fluorinated oil, although not particularly limited, it is preferable to employ the method of coating the fluorinated oil in the state of heating the resin layers to 50 to 100° C. By heating as stated above, it is possible to lower the viscosity of the fluorinated oil, so that it is possible to impregnate the fluorinated oil well.

The mechanical seal device 1 having the seal ring 2 and floating seat 3 of the present embodiment produced by this method can be suitably used for various types of stirring machines or multifunction oven driers provided with solid-liquid separation, washing, and drying functions, vacuum driers, rotary feeder seals, rotary joints, or other dry lubrication applications.

Note that the present invention is not limited to the above embodiments and may be modified in various ways within the scope of the present invention.

EXAMPLES

Below, the present invention will be explained based on more detailed examples, but the present invention is not limited to these examples.

Example 1

As the substrate, silicon carbide (specific gravity 3.05 or more) was used to prepare a sintered body comprised of a seal ring 2 on rotating side and floating seat 3 on stationary side shown in FIG. 1. In this example, the sliding surface 2a of the seal ring 2 on rotating side had an inside diameter of ϕ56.5 mm and an outside diameter of ϕ75 mm (size of seal ring 2 itself being an inside diameter of ϕ56. 5 mm, an outside diameter of ϕ77 mm, and a height of 26.5 mm), while the sliding surface 3a of the floating seat 3 on stationary side had an inside diameter of ϕ58.6 mm and an outside diameter of ϕ66.1 mm (size of floating seat 3 itself being an inside diameter of ϕ56 mm, an outside diameter of ϕ81 mm, and a height of 27 mm).

Further, the respective sliding surfaces 2a and 3a of the seal ring 2 and floating seat 3 were grinded and lapped to obtain a surface roughness Ra of 0.05 µm. Next, the grinded and lapped sliding surfaces 2a and 3a were roughened using 9 µm diamond paper. After this, a 3 µm diamond dispersion was used for polishing to cut the tops of the roughness formed by the roughening in parallel to adjust the sliding surfaces 2a and 3a in surface roughness Ra to 0.30 to 0.35 µm.

Next, resin layers were formed on the sliding surfaces 2a and 3a adjusted in surface roughness as above. The resin layers were formed by using a solution containing a polyamide-imide resin, a polytetrafluoroethylene resin, and a solvent constituted by NMP (N-methyl-2-pyrrolidone) as a solution for forming resin layer, brushing this solution on the sliding surfaces 2a and 3a, and then drying this to give a dried thickness of 25 to 30 μm. Note that, in the solution for forming resin layer, the content of the polyamide-imide resin was made 60 wt % with respect to 100 wt % of the entire solid content, while the content of the polytetrafluoroethylene resin was made 40 wt %. Further, as the polytetrafluoroethylene resin, one with an average particle size in the range of 5 to 7 μm was used.

Figure 2:
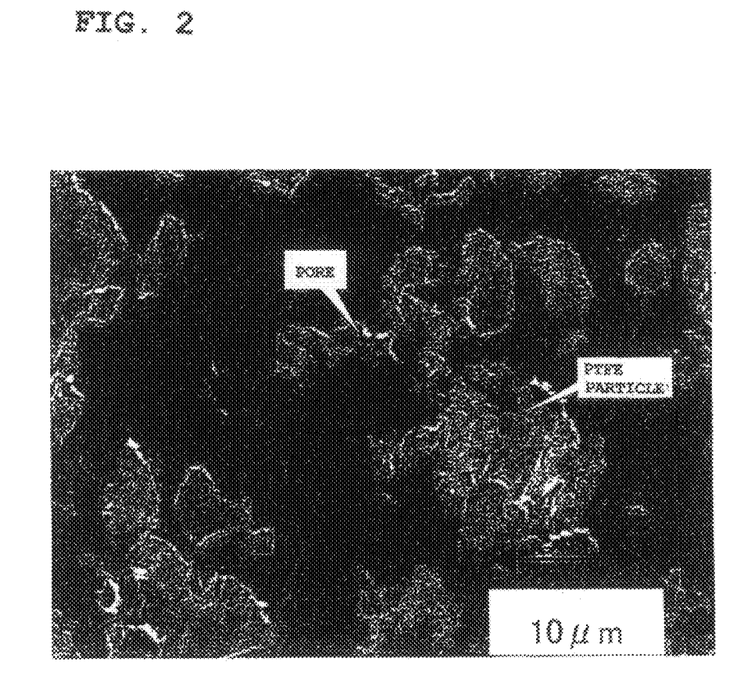
FIG. 2 is a micrograph of a sliding surface of a sliding element in an example of the present invention.

Next, the resin layers formed on the sliding surfaces 2a and 3a were heated under conditions of a temperature of 340° C. and a time of 30 minutes so as to make the polytetrafluoroethylene resin melt and form porous parts in the resin layer. After this, the sliding surfaces 2a and 3a were cooled to ordinary temperature and a 6 μm diamond dispersion was used to grind the resin layers to a depth of 5 μm to expose the porous parts at the surface of the resin layers. A micrograph of the grinded sliding surface 2a is shown in FIG. 2.

Next, the porous parts of the resin layers after grinding of the sliding surfaces 2a and 3a were impregnated with perfluoropolyether to obtain the seal ring 2 and floating seat 3 with sliding surfaces where resin layers having porous parts containing perfluoropolyether were formed. Note that as the perfluoropolyether, a perfluoropolyether with an average molecular weight of 8400 (Daikin Industries, DEMNUM S-200) was used. Further, the perfluoropolyether was impregnated by warming the resin layers to 80° C., and coating the surfaces of the resin layers with a fluoropolyether, followed by spontaneous penetration.

Figure 3A:
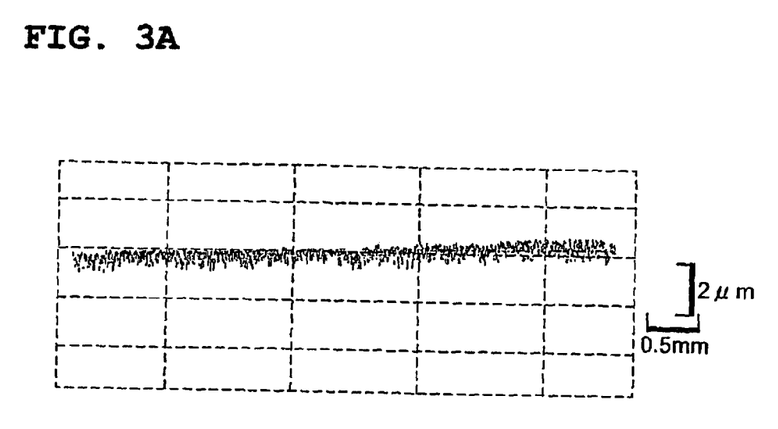
FIG. 3A is a view of the wearing state of a sliding element of an example of the present invention.

Further, the obtained seal ring 2 and floating seat 3 were combined through their sliding surfaces 2a and 3a and subjected to a rotational sliding test as a mechanical seal device. The rotational sliding test was performed at a rotational speed of 300 rpm (rotational speed: 1 m/s), a test atmosphere of a nitrogen atmosphere, a test pressure of 0.8 MPa, and a test time of 100 hours. The amounts of wear of the sliding surface 2a on rotating side and sliding surface 3a on stationary side after 100 hours of testing and the ringing at the time of the test are shown in Table 1. Further, FIG. 3A shows the wearing state of the sliding surface 2a on rotating side after 100 hours of testing.

Comparative Examples 1 to 3

Except for changing the temperature during heat treatment of the resin layers to 300° C. (Comparative Example 1), 260° C. (Comparative Example 2) and 220° C. (Comparative Example 3) respectively, the same procedure was followed as in Example 1 to produce the seal ring 2 and floating seat 3 and to conduct a rotational sliding test. The results are shown in Table 1.

Comparative Example 4

Except for not impregnating the porous parts of the resin layers with a perfluoropolyether, the same procedure was followed as in Example 1 to produce the seal ring 2 and floating seat 3 and to conduct a rotational sliding test. The results are shown in Table 1.

TABLE 1

| | Resin layer [wt %] | | Heat treatment | | Amount of wear [μm] | | Ringing (Sliding |
|---|---|---|---|---|---|---|---|
| | PTFE | PAI | temp. [° C.] | Oil ingredient | Rotating side | Stationary side | noise) |
| Ex. 1 | 40 | 60 | 340 | DEMNUM S-200 | 0.1 | 0 | None |
| Comp. Ex. 1 | 40 | 60 | 300 | DEMNUM S-200 | 1.9 | 1.5 | None |
| Comp. Ex. 2 | 40 | 60 | 260 | DEMNUM S-200 | 1.5 | 1 | None |
| Comp. Ex. 3 | 40 | 60 | 220 | DEMNUM S-200 | 1.8 | 1.5 | None |
| Comp. Ex. 4 | 40 | 60 | 340 | — | 1.5 | 1 | Yes |

Note that in Table 1, PTFE and PAI mean a polytetrafluoroethylene resin and a polyamide-imide resin, respectively (same as above in Table 2 to Table 5).

Evaluation 1

The following can be confirmed from Table 1 summarizing the results of the rotational sliding tests of Example 1 and Comparative Examples 1 to 4. That is, in Example 1 forming the resin layers by a polytetrafluoroethylene resin and a polyamide-imide resin and heat treating them at a temperature of 340° C. which is higher than the melting point of the polytetrafluoroethylene resin, the resin layers were formed with dense porous parts. Therefore, it was possible to impregnate the porous parts with a perfluoropolyether and there was little wear even after 100 hours at both the rotating side and stationary side, which was a preferable result. Further, in this Example 1, ringing did not occur during the rotational sliding.

Figure 3B:
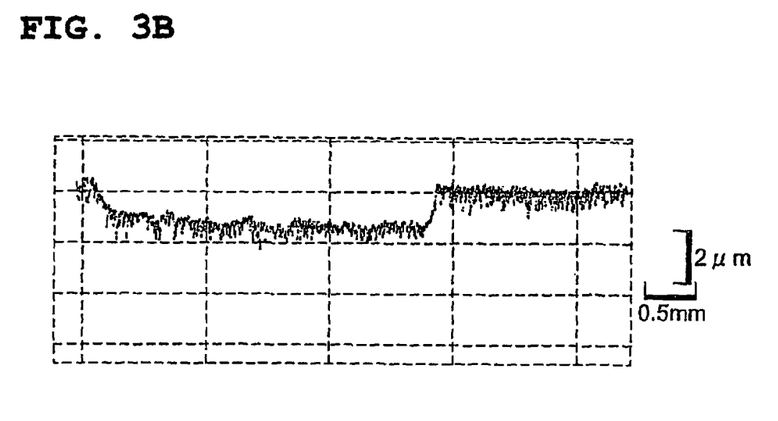
FIG. 3B is a view of the wearing state of a sliding element of a comparative example.

On the other hand, in Comparative Examples 1 to 3 wherein the heating temperatures of the resin layers were 300° C., 260° C., and 220° C. respectively, which were lower than the melting point of the polytetrafluoroethylene resin, the resin layers were not formed with porous parts. Therefore, the perfluoropolyether was not impregnated in the resin layers and the amount of wear became greater in the rotational sliding test. Further, in Comparative Example 4 not impregnated with a perfluoropolyether, the amount of wear became greater and ringing occurred during a rotational sliding test. Note that FIG. 3A shows the wearing state of the sliding surface on rotating side of Example 1, while FIG. 3B shows the wearing state of the rotating side sliding surface on rotating side of Comparative Example 3.

From these results, it can be confirmed that by forming porous parts on the surface of the resin layers forming the sliding surfaces and impregnating the porous parts with fluorinated oil, even under drying conditions, it is possible to effectively prevent wear of the sliding surfaces and ringing due to sliding.

Example 2

Except for changing the polyamide-imide resin to a polyimide resin, the same procedure was followed as in Example 1 to produce the seal ring 2 and floating seat 3 and to conduct a rotational sliding test. The results are shown in Table 2.

Comparative Examples 5 to 7

Except for changing the temperature of the heat treatment of the resin layers to 300° C. (Comparative Example 5), 260° C. (Comparative Example 6) and 220° C. (Comparative Example 7) respectively, the same procedure was followed as in Example 2 to produce the seal ring 2 and floating seat 3 and to conduct a rotational sliding test. The results are shown in Table 2.

TABLE 2

| | Resin layer [wt %] | | Heat treatment temp. [° C.] | Oil ingredient | Amount of wear [μm] | | Ringing (Sliding noise) |
|---|---|---|---|---|---|---|---|
| | PTFE | PI | | | Rotating side | Stationary side | |
| Ex. 2 | 40 | 60 | 340 | DEMNUM S-200 | 0.3 | 0 | None |
| Comp. Ex. 5 | 40 | 60 | 300 | DEMNUM S-200 | 2 | 1.5 | None |
| Comp. Ex. 6 | 40 | 60 | 260 | DEMNUM S-200 | 2.1 | 1.5 | None |
| Comp. Ex. 7 | 40 | 60 | 220 | DEMNUM S-200 | 2.2 | 1.5 | None |

Note that in Table 2, PI means a polyimide resin.

Evaluation 2

Even when using a polyimide resin instead of a polyamide-imide resin as the resin forming the resin layers, it can be confirmed to obtain similar results.

Examples 3 to 6

Except for changing a part of the polytetrafluoroethylene resin contained in the resin layer to graphite powder as shown in Table 3, the same procedure was followed as in Example 1 to produce the seal ring 2 and floating seat 3 and to conduct a rotational sliding test. The results are shown in Table 3.

TABLE 3

| | Resin layer [wt %] | | | Heat treatment temp. [° C.] | Oil ingredient | Amount of wear [μm] | | Ringing (Sliding noise) |
|---|---|---|---|---|---|---|---|---|
| | PTFE | PAI | Graphite powder | | | Rotating side | Stationary side | |
| Ex. 3 | 35 | 60 | 5 | 340 | DEMNUM S-200 | 0.2 | 0 | None |
| Ex. 4 | 25 | 60 | 15 | 340 | DEMNUM S-200 | 0.4 | 0 | None |
| Ex. 5 | 15 | 60 | 25 | 340 | DEMNUM S-200 | 0.6 | 0.1 | None |
| Ex. 6 | 5 | 60 | 35 | 340 | DEMNUM S-200 | 0.7 | 0.2 | None |

Evaluation 3

From Table 3, it can be confirmed that even when introducing graphite powder in the resin layers, the effect of the present invention can be obtained. Note that from Table 3, if the content of the polytetrafluoroethylene resin decreases, it can be confirmed that the amount of wear tends to increase somewhat.

Examples 7 to 9

Except for changing the substrate to carbon (Example 7), an aluminum oxide ceramic (Example 8), and a silicon carbide and carbon composite material (Example 9), the same procedure was followed as in Example 1 to produce the seal ring 2 and floating seat 3 and to conduct a rotational sliding test. Note that in Example 9, the ratio of mixture of silicon carbide and carbon was a weight ratio of 40:60. The results are shown in Table 4.

TABLE 4

| | Substrate | Resin layer [wt %] | | Heat treatment temp. [° C.] | Oil ingredient | Amount of wear [μm] | | Ringing (Sliding noise) |
|---|---|---|---|---|---|---|---|---|
| | | PTFE | PAI | | | Rotating side | Stationary side | |
| Ex. 7 | Carbon | 40 | 60 | 340 | DEMNUM S-200 | 0.2 | 0 | None |
| Ex. 8 | Aluminum oxide ceramic | 40 | 60 | 340 | DEMNUM S-200 | 0.1 | 0 | None |
| Ex. 9 | SiC 40%, Carbon 60% | 40 | 60 | 340 | DEMNUM S-200 | 0.1 | 0 | None |

Evaluation 4

From Table 4, it can be confirmed that even if changing the substrate to carbon, an aluminum oxide ceramic, and a silicon carbide and carbon composite material, the effect of the present invention can be obtained.

Examples 10 and 11

Except for changing the type of the perfluoropolyether contained in the porous parts of the resin layers, the same procedure was followed as in Example 1 to produce the seal ring 2 and floating seat 3 and to conduct a rotational sliding test. Note that in Example 10, a perfluoropolyether with an average molecular weight of 6250 (AUSIMONT, FOMBLIN YR), while in Example 11, a perfluoropolyether with an average molecular weight of 7500 (NOK Kluber, BARRIERTA J400) were used. The results are shown in Table 5.

TABLE 5

| | Resin layer [wt %] | | Heat treatment temp. [° C.] | Oil ingredient | Amount of wear [μm] | | Ringing (Sliding noise) |
|---|---|---|---|---|---|---|---|
| | PTFE | PAI | | | Rotating side | Stationary side | |
| Ex. 1 | 40 | 60 | 340 | DEMNUM S-200 | 0.1 | 0 | None |
| Ex. 10 | 40 | 60 | 340 | FONBLIN YR | 0.1 | 0 | None |
| Ex. 11 | 40 | 60 | 340 | BARRIERTA J400 | 0.1 | 0 | None |

From Table 5, it can be confirmed that even if using perfluoropolyether with different molecular weights, the effect of the present invention can be obtained.

The invention claimed is:

1. A mechanical seal device comprising:
   a rotating ring and a stationary ring, the rotating ring and the stationary ring being pressed against each other through sliding surfaces of the rotating ring and the stationary ring, the sliding surfaces of the rotating ring and the stationary ring forming seal surfaces,
   wherein the sliding surfaces of the rotating ring and the stationary ring are formed on their surfaces with resin layers having a plurality of porous parts containing fluorinated oil,
   the resin layers of the rotating ring and the stationary ring each are formed on respective substrates and comprise, in the same way, a first resin and a second resin having a melting point that is higher than a melting point of the first resin;
   the plurality of porous parts of the resin layer of the sliding surface for each of the rotating ring and the stationary ring are exposed to and open to an outside on the surface of the resin layer;
   the plurality of porous parts of both sliding surfaces of the rotating ring and the stationary ring are formed by heating the resin layers at a temperature of at least a melting point of the first resin and less than a melting point of the second resin to form the plurality of porous parts mainly inside of the resin layers;
   grinding the surfaces of the resin layers after heating to exposed the plurality of porous parts to the surfaces of the resin layers;
   said first resin is a polytetrafluoroethylene resin and/or its modified product;
   said second resin is a polyamide-imide resin and/or polyimide resin;
   a content of said first resin with respect to 100 wt % of said resin layer as a whole is 5 to 55 wt %; and
   the ratio of presence of the porous parts with respect to 100% of the surface of said resin layer as a whole is, in ratio of area, 1 to 10%.

2. The mechanical seal device as set forth in claim 1, wherein the thickness of the resin layer is 10 to 30 μm.

3. The mechanical seal device as set forth in claim 1, wherein at least the portions forming the sliding surfaces are roughened at the surfaces of the substrate.

4. The mechanical seal device as set forth in claim 1, wherein the fluorinated oil is a perfluoropolyether comprised of carbon atoms, fluorine atoms and oxygen atoms, and/or its modified product.

5. The mechanical seal device as set forth in claim 1, wherein the substrate is one selected from carbon, silicon carbide, a carbon and silicon carbide composite material, and a ceramic material.

6. The mechanical seal device as set forth in claim 1, wherein: a polytetrafluoroethylene resin, if using a polytetrafluoroethylene resin as the first resin, is dispersed in the solvent in the state of particles having a certain particle size so as to prepare the solution for forming resin layer,
   the solution for forming resin layer is used to coat the portions forming the sliding surfaces and the solvent contained in this coated solution for forming resin layer is removed to obtain the resin layers before heating, and
   the resin layer is heated to selectively make the first resin melt, and thereby causes the formation of porous parts between the melted first resin and solid-state second resin, and provides a plurality of the porous parts over the entire inside of the resin layers.

* * * * *